United States Patent
Shavit et al.

(10) Patent No.: US 7,937,378 B2
(45) Date of Patent: May 3, 2011

(54) CONCURRENT LOCK-FREE SKIPLIST WITH WAIT-FREE CONTAINS OPERATOR

(75) Inventors: Nir N. Shavit, Cambridge, MA (US); Yosef Lev, Cambridge, MA (US); Maurice P. Herlihy, Brookline, MA (US)

(73) Assignee: Oracle America, Inc., Redwood Shores, CA (US)

( * ) Notice: Subject to any disclaimer, the term of this patent is extended or adjusted under 35 U.S.C. 154(b) by 439 days.

(21) Appl. No.: 12/191,008

(22) Filed: Aug. 13, 2008

(65) Prior Publication Data

US 2010/0042584 A1    Feb. 18, 2010

(51) Int. Cl.
*G06F 7/00* (2006.01)
(52) U.S. Cl. .................. 707/704; 707/800; 719/321
(58) Field of Classification Search .............. 719/321; 707/704, 800
See application file for complete search history.

(56) References Cited

U.S. PATENT DOCUMENTS

| | | | | |
|---|---|---|---|---|
| 5,953,522 | A * | 9/1999 | Fox et al. | 719/321 |
| 7,117,502 | B1 * | 10/2006 | Harris | 719/315 |
| 7,424,477 | B1 * | 9/2008 | Martin et al. | 1/1 |
| 2008/0163175 | A1 * | 7/2008 | Krauss | 717/127 |
| 2009/0132563 | A1 * | 5/2009 | Herlihy et al. | 707/100 |

OTHER PUBLICATIONS

Lotan, Itay et al., "Skiplist-Based Concurrent Priority Queues," In Proceedings of the 14th International Parallel and Distributed Processing Symposium, pp. 1-23, IEEE Computer Society, Washington, D.C., 2000.*

Sundell et al., Fast and Lock-Free Concurrent Priority Queues for Multi-Thread Systems, Technical Report No. 2003-01, Department of Computing Science Chalmers University of Technology and Göteborg University SE-412 96 Göteborg, Sweden, pp. 1-15.*

Valois J., Implementing Lock-Free queues, Proceedings of the Seventh International Conference on Parallel and Distributed Computing Systems, Las Vegas, NV, Oct. 1994, pp. 1-9.*

* cited by examiner

*Primary Examiner* — Cheyne D Ly
(74) *Attorney, Agent, or Firm* — Park, Vaughan, Fleming & Dowler LLP

(57) ABSTRACT

Apparatus, methods, and computer program products are disclosed for performing a wait-free search of a concurrent, lock-free skiplist to determine existence of a sought-after key.

14 Claims, 6 Drawing Sheets

US 7,937,378 B2

CONCURRENT LOCK-FREE SKIPLIST WITH WAIT-FREE CONTAINS OPERATOR

CROSS-REFERENCE TO RELATED APPLICATIONS

The following United States patent applications have been filed with inventors that overlap the inventors of the instant application: U.S. Provisional Application No. 60/988,897, filed: 19 Nov. 2007, entitled A SIMPLE OPTIMISTIC SKIPLIST ALGORITHM, with first named inventor: Maurice P. Herlihy; and U.S. Utility application Ser. No. 12/165,086, filed 30 Jun. 2008, entitled SIMPLE OPTIMISTIC SKIPLIST, with first named inventor: Maurice P. Herlihy.

BACKGROUND

1. Technical Field

The disclosed technology relates to the field of concurrently accessed data structures used by computer systems.

2. Related Art

FIG. 1 illustrates a skiplist data structure 100 as is commonly understood by one skilled in the art. The skiplist data structure 100 is a collection of sorted linked lists, each at a given "level," that mimics the behavior of a search tree. A skiplist is usually bounded by a left-sentinel node 103 and a right-sentinel node 104, each of which has a maximum level 105. The maximum level 105 for the skiplist data structure 100 is 4. The skiplist data structure 100 contains a bottom-list-level 107 (a bottom-level linked list), a second-list-level 109, a third-list-level 111, and a maximal-list-level 113. For a non-empty skiplist, the bottom-list-level 107 links a number of nodes (such as a bottom-level node 115) in key-sort order (5, 7, 8, 13, 15, 22, 25). The skiplist data structure 100 also contains a second-level node 117 and a third-level node 119. These nodes are data nodes that contain key information, metadata about the node, and links for each level of the skiplist to which the data node is linked. The highest skiplist level to which the node is linked is the node's topLevel value. One skilled in the art will understand that in some equivalent embodiments, a node can be split to multiple nodes (or subnodes), one in each level, where a (sub)node in each level points to the (sub)node in the level beneath it, in addition to the succeeding node in the same level.

The list at each level, other than the bottom-list-level, is a sublist of lists at the lower levels. Each node is assigned a random toplevel, up to the maximum skiplist level, and participates in the lists up to that level. In a skiplist that maintains the traditional skiplist invariant, the number of nodes in each list decreases exponentially with the level, implying that a key can be quickly found by searching first at higher levels, skipping over large numbers of shorter nodes, and progressively working downward until a node with the desired key is found, or the bottom level is reached. Thus, the expected time complexity of skiplist operations is logarithmic in the length of the list.

The left-sentinel node 103 and the right-sentinel node 104 have the maximum allowed skiplist level, and initially, when the skiplist is empty, the right-sentinel node 104 is the successor of the left-sentinel node 103 at every level. The key for the left-sentinel node 103 is smaller, and the key for the right-sentinel node 104 is greater, than any key that may be added to the skiplist. Searching the skiplist thus begins at the left-sentinel node 103.

A skiplist is an important data structure for storing and retrieving ordered data, because it does not need to be rebalanced (as do many tree structures), because of its highly distributed nature (which helps reduce contention in concurrent applications), because of its logarithmic search characteristic.

"Lock-freedom" is a progress characteristic that guarantees that if some threads are executing method calls, and at least one thread continues taking steps, then at least one thread will complete its call. It guarantees that the system as a whole continues to make progress, but makes no progress guarantee for any individual thread.

"Wait-freedom" is a stronger progress characteristic than lock-freedom and guarantees that any thread that continues taking steps in executing a method call will eventually complete the call. One skilled in the art of concurrent programming would understand that a lock-free operation on a data structure specifies that the operation does not use locks on the data structure while still enabling other concurrent operations (some of which may not have the lock-freedom characteristic) on the data structure. Note that a lock-free operation may need to restart if it detects concurrent modifications to the data structure. Thus, in high contention situations the lock-free operation may not timely complete and will delay the thread that invoked the lock-free operation. By comparison, a wait-free operation will complete without retrying and without waiting for any locks, and will not delay the invoking thread no matter the level of contention.

For a skiplist, a wait-free Contains programmed-method is important because for the most common search structure usage patterns, the Contains operation (which tests or searches whether a key is in the skiplist) significantly dominates the Add operations, and the Add operations dominate the Remove operations. A typical pattern, for example, is 90% Contains operations, 9% Add operations, and 1% Remove operations. Thus, any improvement to the performance of the Contains operation is an improvement to the most common skiplist usage pattern. Search structures are used in many high-performance real-time applications. In such applications, it is important to have a bound on the number of steps a programmed-method call may take before returning. Wait-free programmed-methods are desirable because they can provide such bounds.

The ConcurrentSkipListMap (and ... Set) implementation released as part of the Java® SE 6 platform is the most effective concurrent lock-free skiplist implementation known to the inventors. Although the algorithm provides a lock-free Contains programmed-method, it unfortunately does not provide a wait-free one. The Contains programmed-method participates in the cleanup of removed nodes, and during concurrent operations this cleanup is a source of contention-related delays. Because of the importance of providing a wait-free Contains operation, the ConcurrentSkipListMap provides a partial wait-free Contains operation: that is, a wait-free contains that is backed up with a lock-free one in case the key is found on a logically-deleted node.

One skilled in the art will understand that implementing concurrent data structures is complex and fraught with subtle and often unexpected difficulties and, further, that the use of synchronization mechanisms, such as locks, atomic operations, etc., can cause unexpected delays to operations on the concurrent data structure when many threads are contending for access to the data structure. Such a one will also understand that concurrent linked-list algorithms exist that use optimistic fine-grained locking for the Add and Remove operations, and a wait-free Contains operation (Heller et al., "A Lazy Concurrent List-Based Set Algorithm," Proceedings of 9th International Conference on Principles of Distributed Systems, 2005). While one not skilled in the art may naively believe that the use of such technology could be used to implement a lock-free skiplist having a wait-free Contains operation, one skilled in the art will understand that such algorithms rely on the nodes in the list having only one link for the list. Further, such a one will understand that where there are multiple list-links (as in a lock-free skiplist node), nodes cannot be atomically inserted or removed from all of its list-levels.

DETAILED DESCRIPTION

Figure 1:
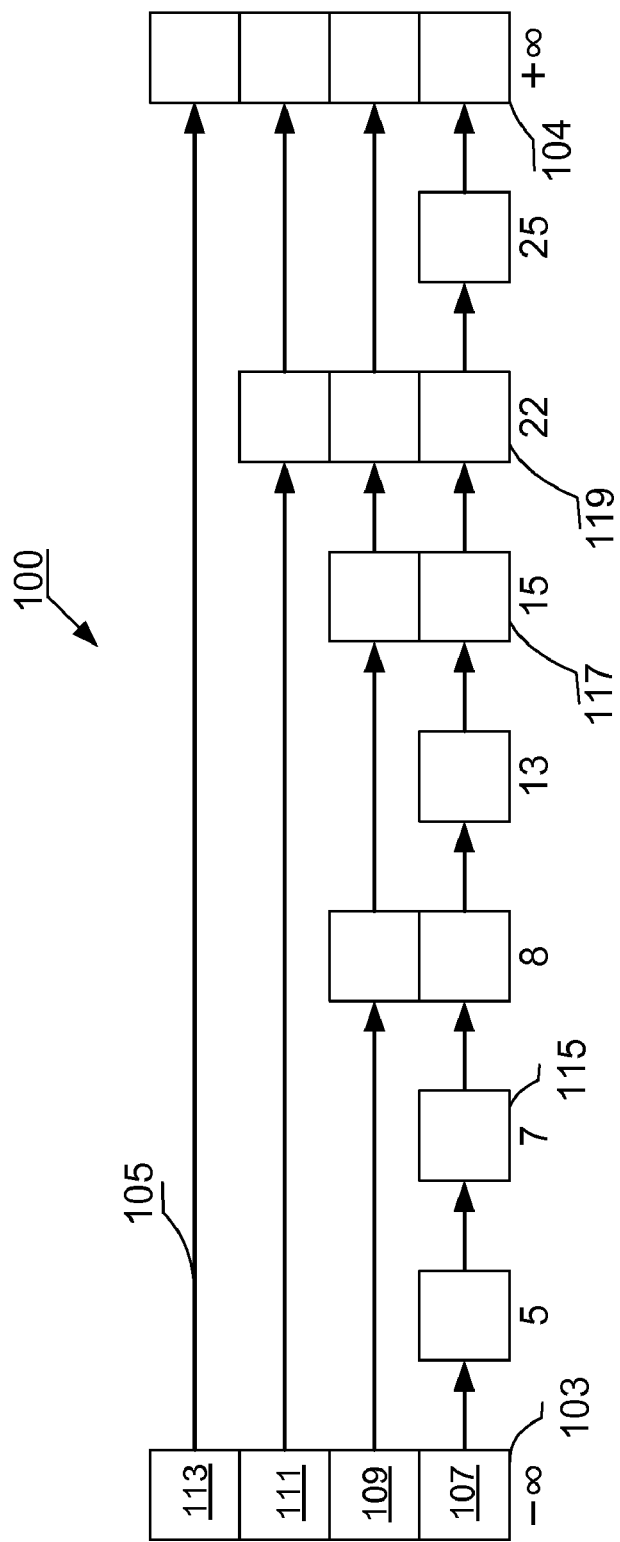
FIG. 1 illustrates an example skiplist data structure.

The technology disclosed herein teaches an improvement to a method used by a computer for concurrently searching a memory that contains a lock-free skiplist data structure to determine whether a sought-after key exists in the lock-free skiplist data structure. First, the method locates the lock-free skiplist data structure in the memory. The lock-free skiplist data structure includes a plurality of linked lists, including a bottom-level linked list, one or more higher-level linked lists, and a plurality of nodes. Each of the plurality of nodes includes a key field and one or more list-level reference fields. Each of the plurality of nodes is linked to the bottom-level linked list through the one or more list-level reference fields and ordered according to the key field. The method performs a wait-free search traversal by a first execution thread for the sought-after key on the lock-free skiplist data structure while the lock-free skiplist data structure is subject to concurrent alteration of the plurality of nodes by a second execution thread. The wait-free search traversal terminates on the bottom-level linked list at a located node of the plurality of nodes having the key field that contains a comparison transition key. The method then returns a result responsive as to whether the sought-after key equals the comparison transition key. Apparatus that perform the method and program products that contain computer instructions that, when executed by a computer, cause the computer to perform the method are also disclosed. Thus, the technology disclosed herein is directed to the structure of and operations on a concurrently modified skiplist that has a wait-free membership test operation.

The following are provided to assist in the understanding of the technology presented herein and embodiments thereof.

Data Structure—A data structure is an ordered arrangement of storage in memory for variables. A data structure is generally part of an object-oriented object. A data structure can reside in the computer's memory and/or on a file system.

Object—An object in the object-oriented programming paradigm is an association between programmed-methods and the data structures defined by a class and the instantiated storage that represents an object of the class.

Pointer—A pointer is a data value that is used to reference a data structure or an object. One skilled in the art will understand that "pointer" includes, without limitation, a memory address to, or a value used to calculate the address to the information of interest and any functional equivalents, including handles, references, and similar constructs, as well as the Java™ programming language's AtomicMarkableReferences class and the like. A pointer thus "points to", "links to", or otherwise identifies null, some object, and/or some data structure.

Programmed-method—A programmed-method is a programmed procedure associated with an object. The programmed-method is invoked to cause the object to perform an operation. In the procedural programming paradigm, a programmed-method is equivalent to a programmed routine or function.

Procedure—A procedure is a self-consistent sequence of steps that can be performed by logic implemented by a programmed computer, specialized electronics or other circuitry, or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods, programmed-method and processes described herein can be implemented with logics such as, for example but without limitation, an atomic linking logic, a second atomic linking logic, a bottom-list-level mark detection logic, a key comparison logic, a list advance logic, a lock-free traversal logic, a locator logic, a node allocation logic, a higher-list-level marking logic, a bottom-list-level marking logic, a mark detection logic, a node locator logic, a node position refresh logic, a result logic, a wait-free search logic, a first snip logic, a second snip logic, a test mark logic, a list advance logic, a mark detection logic, etc.

One skilled in the art will understand that although the following description of the technology is cast within an object-oriented paradigm, the techniques disclosed are applicable to other programming paradigms.

Figure 2:
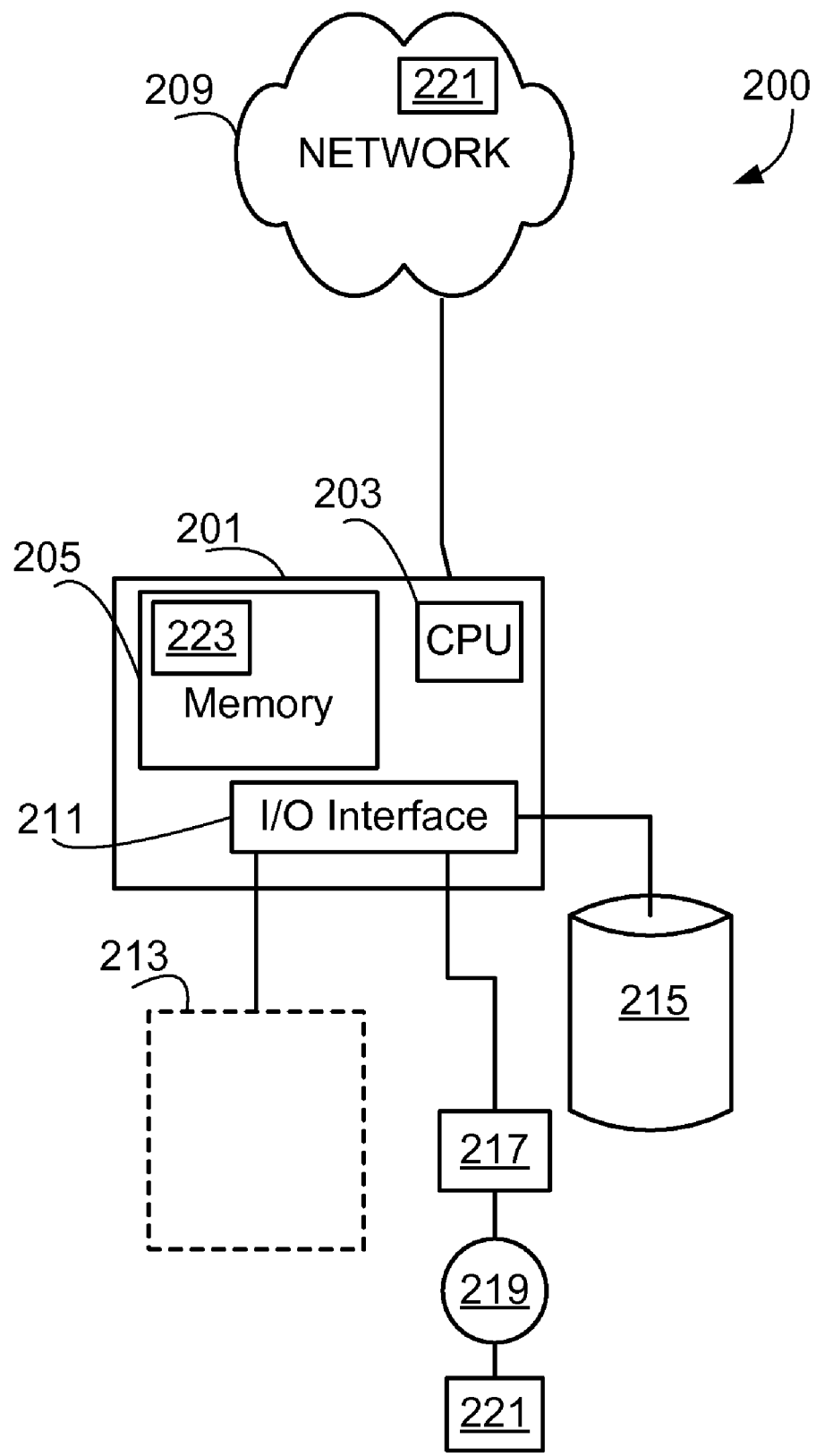
FIG. 2 illustrates a networked computer system that can use the disclosed technology.

FIG. 2 illustrates a networked computer system 200 that can incorporate the technology described herein. The networked computer system 200 includes a computer 201 that incorporates a CPU 203, a memory 205 that can be accessed by each of the processors in the CPU 203, and a network interface (not shown). The network interface provides the computer 201 with access to a network 209. The memory 205 can be any technology that enables multiple processors to interleave read and write accesses to the memory. It is random access in the sense that any piece of data can be returned in constant time, regardless of the data's physical location and whether or not the returned data is related to the previous piece of data. Such memory can be core, SRAM, DRAM, EPROM, EEPROM, NOR flash, etc. The computer 201 also includes an I/O interface 211 that can be connected to an optional user interface device(s) 213, a storage system 215, and a removable data device 217. The removable data device 217 can read a computer-usable data carrier 219 (such as a fixed or replaceable ROM within the removable data device 217 itself (not shown)), as well as a computer-usable data carrier that can be inserted into the removable data device 217 itself (such as a memory stick, CD, floppy, DVD or any other tangible media) that typically contains a program product 221. The user interface device(s) 213 can include a display device(s) and user input devices (not shown). The storage system 215 (along with the removable data device 217), the computer-usable data carrier 219, and (in some cases the network 209) comprise a file storage mechanism. The program product 221 on the computer-usable data carrier 219 can be read into the memory 205 or non-shared memory as a program 223 which instructs the CPU 203 to perform specified operations. In addition, the program product 221 can be provided from devices accessed using the network 209. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 209. Thus, the network 209, like a tangible physical media, can be a computer-usable data carrier. One skilled in the art will understand that not all of the displayed features of the computer 201 need to be present for all embodiments that implement the techniques disclosed herein. In addition such a one will understand that the technology disclosed herein will also apply to SMP systems where the processors are separate so long as the processors are in communication with, and share access to, the memory 205. Further, one skilled in the art will understand the technology disclosed herein can also be used with a single CPU or single core CPU and non-shared memory, and that computers are ubiquitous within modern devices ranging from cell phones to vehicles to kitchen appliances, etc.

The networked computer system 200 is but one example where the technology disclosed herein can be used. Other examples include massive multiprocessor systems that can have processor-dedicated memory and at least one shared memory that is coupled between some or all of the processors in the massive multiprocessor system.

The technology herein disclosed is a new, high-performance, concurrent, lock-free skiplist algorithm having lock-free Add and Remove operations and a wait-free membership test (for example, a wait-free Contains operation). Herein the term "algorithm" means procedures involved with the search and modification of a lock-free skiplist that can reside in a computer's memory or file storage. In addition, while the algorithm can be used with a single thread of execution, the algorithm can also be used with threads that are concurrently executing on one or more computers or processing units and accessing a single memory or storage that contains the lock-free skiplist.

The algorithm is described in the context of an implementation of a set object that supports the Add, Remove and Contains programmed-methods: Add (v) adds v to the abstract set if it is not already in the abstract set and returns true if and only if v was not already in the abstract set; Remove (v) removes v from the abstract set if it is present and returns true if and only if v was in the abstract set; and Contains (v) returns true if and only if v is in the abstract set. After reading the disclosed technology, one skilled in the art would understand how to implement a corresponding map object.

Included herein is a listing of Java-based pseudocode that represents one embodiment of the disclosed technology; while the figures are illustrative, the pseudocode teaches one embodiment to one skilled in the art. Other embodiments can be implemented differently. The pseudocode is presented within an object-oriented programming paradigm that assumes garbage collection capability. However, the disclosed technology also applies to procedural programming. One skilled in the art of concurrent programming would understand that the algorithms can also be translated and used with traditional languages and those that require explicit de-allocation of allocated memory.

Each node in the lock-free skiplist can contain a Next field that can be an array (or ordered collection) of list-level references (or equivalent), one for each of the lock-free skiplist's list-levels to which the node can be linked (the node's TopLevel). Each of these list-level references is a forward reference that identifies the node's successor node for that list-level. Finding a sought-after key means determining a node position in the lock-free skiplist for that sought-after key, whether or not a node containing the sought-after key actually exists in the lock-free skiplist. The node position respective to a sought-after key can be defined by list-level references to predecessor nodes and to successor nodes of where a node that contains the sought-after key is or would be positioned at each level in the lock-free skiplist. Note that the list-level references in the Next field of the node generally identify different successor nodes. The bottom-list-level reference of the predecessor nodes in the node position identifies a located node that has a comparison transition key (in one embodiment, the comparison transition key is greater than or equal to the sought-after key and can be the key assigned to the right-sentinel node—in which case the located node is the right-sentinel node). Notice also, that once the node position is determined it can become out of date if there is a concurrent modification to the lock-free skiplist. One skilled in the art will understand that the node position can be an object, a pair of list-level reference arrays (such as the preds [ ] and succs [ ] arrays that are used in the pseudocode) or any equivalent. Such a one will also understand that there are many equivalent ways to organize the nodes and list-level references; and that the technology is not limited to the specific node and list-level reference relationships described herein.

For the technology described herein, list-level references have a "marked" property and a "reference" property that are operated on atomically. The marked property can be a Boolean while the reference property supplies the forward reference that identifies a successor node linked to the list-level of the list-level reference. A list-level reference can be marked or unmarked. In one embodiment, if the list-level reference is marked, the node (that contains the marked list-level reference in its Next field) has been logically-deleted from the corresponding list-level of the lock-free skiplist. In this embodiment the key contained by (on) the node is not in the abstract set if the node's bottom-list-level reference is marked. Manipulations on the list-level references can be performed using a compare-and-set operation. In a Java implementation the list-level reference can be an instantiation of the AtomicMarkableReference class and operations on a list-level reference can use that class's CompareAndSet programmed-method.

List-level references in the sentinel nodes are always unmarked. One skilled in the art will understand that the key of the right-sentinel node is greater than the maximum key that is allowed to be in the abstract set; and that the list-level reference for the list-levels can be null, zero, or any value that indicates the end of a linked-list; and that the key of the left-sentinel node is less than the smallest key that is allowed to be in the abstract set and the list-level references for the list-levels identify either the right-sentinel node, or a node that has a key that is less than the key of the right-sentinel node.

Conceptually, to determine whether a sought-after key is a member of the abstract set represented by the lock-free skiplist, a search starts at the top-list-level of the left-sentinel node and descends down the list-levels from the top-list-level to the bottom-list-level, and advances across each list-level by maintaining list-level references to a predecessor node and a current node (pred and curr). While advancing across the list-level and after locating a node having a key that is equal to or greater than the sought-after key, the values of pred and curr are recorded in a node position as the predecessor node and successor node for that list-level, and then the search descends to the next lower list-level. The search ends at the bottom-list-level at a located node with a key that matches or is greater than the sought-after key (the key of the located node being the comparison transition key). The search can determine whether the sought-after key is in the lock-free skiplist by determining whether the comparison transition key equals the sought-after key. Thus, to be in the abstract set, the located node contains the sought-after key and has an unmarked bottom-list-level reference.

Conceptually, to add a key to the abstract set, the node position for the key-to-be-added is determined, and if the key-to-be-added is not equal to the comparison transition key, the key-to-be-added is not in the abstract set. If the key-to-be-added is not in the abstract set, a new node is allocated to hold the key-to-be-added, and the new node is inserted at the node position. One skilled in the art will understand that there are many ways to allocate the new node including, for example, allocation from a heap, from a free-node cache, etc.

Conceptually, to remove a key from the abstract set, the node position is determined for the sought-after key, and if the sought-after key equals the comparison transition key (the key of the located node), the located node is snipped (physically deleted) from each of its list-levels by redirecting, for each of the located node's list-levels, the predecessor nodes' list-level reference to the corresponding successor node of the located node.

For a concurrent, lock-free skiplist, the implementation of the previously described conceptual operations is complex.

One skilled in the art will understand that a skiplist was initially defined as having a skiplist invariant property wherein each list-level is a sublist of its lower-list-level. Multi-list-level data structures that do not have this property, but that have similar operational characteristics can also be referred to as a skiplist. Thus, the concurrent, lock-free multi-list-level data structure defined herein is also termed a skiplist even though, in concurrent environments, the skiplist invariant property may not be maintained.

In a concurrent, lock-free skiplist, the skiplist invariant property is hard to maintain because locks cannot be used (by definition) to atomically manipulate all of the list-level references of a node. However, the abstract set is defined by the keys of the nodes that are in the bottom-list-level of the lock-free skiplist; that is, a key is in the abstract set if there exists a node with that key that has an unmarked bottom-list-level reference (note that if the bottom-list-level reference was marked, the node would be in the process of being deleted and its key will have been removed from the abstract set). Thus, nodes linked at the higher-list-levels only serve as shortcuts to the bottom-list-level.

The Add operation in a lock-free skiplist determines the node position for the to-be-added node and whether a node with the to-be-added key is already in the lock-free skiplist. If not, a new node is prepared with a randomly chosen TopLevel (the number of list-levels to which the new node will be linked) and the to-be-added key. In addition, the new node's Next list-level references are set to its ostensible successor nodes from the node position. Next, the Add operation attempts to add the to-be-added key to the abstract set by inserting the new node into the bottom-list-level of the lock-free skiplist at the node position (thus, prior to the located node). If the insertion succeeds, the to-be-added key has become a member of the abstract set. The Add operation then links the new node into its remaining higher-list-levels while updating the node position if needed to accommodate concurrent changes to the lock-free skiplist.

The Remove operation in a lock-free skiplist determines whether a node with the sought-after key is already linked into the bottom-list-level of the lock-free skiplist and has an unmarked bottom-list-level reference. In the process, the Remove operation has determined the node position and the located node. If the comparison transition key equals the sought-after key, the list-level references in the located node are marked starting from the located node's TopLevel down to the next-to-bottom-list-level so that the located node is logically-deleted from each of the upper-list-levels while adjusting the node position if needed to accommodate concurrent changes to the lock-free skiplist.

Once the list-level references have been marked for the upper-list-levels in the located node, the Remove operation marks the list-level reference for the bottom-list-level of the located node. If successful, this marking logically deletes the located node from the lock-free skiplist and thus removes the sought-after key from the abstract set. The physical deletion of the located node can be subsequently performed by the Remove operation itself, or by another thread that is in the process of traversing the lock-free skiplist to determine a node position as is subsequently described with respect to FIG. 3. One skilled in the art will understand that physical deletion (or physical removal) means that the physically-deleted node is no longer reachable from the skiplist. As will be seen, after a node has been snipped out of all its list-levels, it has been physically deleted from the lock-free skiplist.

One skilled in the art will understand that if a compare-and-set operation fails in either of the Add or Remove operations (which means that the lock-free skiplist was concurrently modified by another thread), the operation may re-determine the node position.

As previously described, note that the abstract set is defined only by the bottom-list-level of the lock-free skiplist; that nodes in the higher-list-levels are used as shortcuts to the bottom-list-level; and that the term "lock-free skiplist" encompasses data structures that may or may not have the skiplist invariant property. We turn now to the description of a representative embodiment of a lock-free skiplist that has a wait-free Contains operation.

Figure 3:
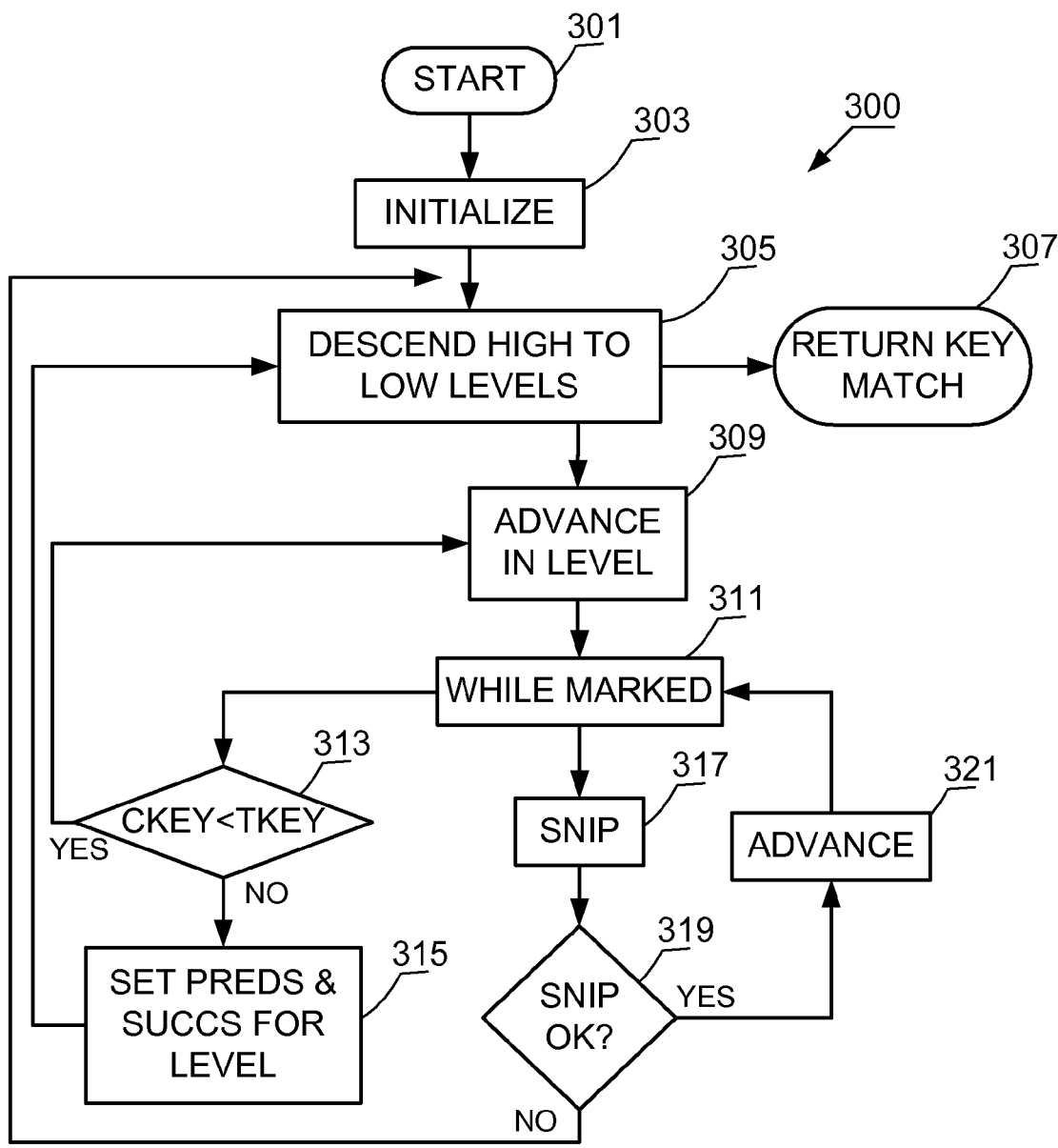
FIG. 3 illustrates a lock-free find node process.

FIG. 3 illustrates a lock-free find node process 300 (pseudocode statement 105) that determines a node position for a sought-after key and physically deletes logically-deleted nodes that are encountered when determining a node position. The lock-free find node process 300 traverses the lock-free skiplist, starting at the top-list-level of the left-sentinel node and advancing across each list-level. While doing so, the lock-free find node process 300 detects whether a node it encounters contains a marked list-level reference on the current list-level. If so, the lock-free find node process 300 ignores the encountered node's key and snips the encountered node from that list-level. Thus, a node may be physically deleted from one list-level while the node is in the process of being linked into the higher-list-levels. One skilled in the art of concurrent programming will understand that if the lock-free find node process 300 passes through a node's middle-list-level references it may remove these list-level references and thus break the skiplist invariant property.

The lock-free find node process 300 initiates at a start terminal 301, continues to an 'initialization' procedure 303 that performs any needed initialization and then to an 'iterate list-levels' procedure 305 that starts the search for the sought-after key on the highest-list-level of the left-sentinel of the lock-free skiplist. Subsequent iterations from the 'iterate list-levels' procedure 305 descend from a higher- to a lower-list-level. Arguments to the lock-free find node process 300 can include two maximal-level collections (for example, preds [ ] and succs [ ] arrays that that can be used to return the node position) as well as the sought-after key.

After the bottom-list-level of the lock-free skiplist is reached, the lock-free find node process 300 will have established a node position where the bottom-list-level reference for the successor node will identify a located node that contains a key, which is a comparison transition key respective to the sought-after key. The comparison transition key is the key of the first node that is linked into the bottom-list-level (and that has an unmarked bottom-list-level reference) that is greater than or equal to the sought-after key. If the comparison transition key is equal to the sought-after key a 'return key match' terminal 307 returns a result of true, otherwise false.

The node position defines where a node containing the sought-after key is or would be located (assuming no concurrent changes to the lock-free skiplist). The preds [ ] and succs [ ] in the node position will have been filled for each list-level of the lock-free skiplist with the corresponding list-level references for the predecessor node and successor node for that list-level.

As each list-level is iterated by the 'iterate list-levels' procedure 305, an 'advance in list-level' procedure 309 atomically gets the current node's successor node for that list-level and determines whether the list-level reference to the successor node was marked. If a 'while marked' procedure 311 determines that the list-level reference to the successor node was not marked, the lock-free find node process 300 continues to a 'continue advance' decision procedure 313 that compares whether the key of the current node is strictly less than the sought-after key. If the key of the current node is less than the sought-after key, the lock-free find node process 300 continues back to the 'advance in list-level' procedure 309 to advance to a successor node on the iterated list-level. However, if the key of the current node is greater than or equal to the sought-after key, the lock-free find node process 300 has completed advancing on that list-level and a 'set level state' procedure 315 records the list-level reference values for the node position information in the preds [ ] and succs [ ] arrays for the iterated list-level. Next the lock-free find node process 300 continues back to the 'iterate list-levels' procedure 305 to descend to the next lower list-level in the lock-free skiplist.

However, if the 'while marked' procedure 311 determines that the list-level reference to the successor node was marked (thus, the current node has been, or is in the process of being logically-deleted from the lock-free skiplist), the lock-free find node process 300 continues to a 'snip' procedure 317 that attempts to atomically unlink the encountered node from the predecessor node on the iterated list-level by linking the encountered node's predecessor node to the current node's successor node on the iterated list-level. Then a 'snip success' decision procedure 319 determines whether the snip operation was successful. If the snip operation was not successful, the lock-free find node process 300 restarts the Find operation by looping back to the 'iterate list-levels' procedure 305 to update the node position—thus, the Find operation does not have the wait-free characteristic. Such a failure can result from a race with another thread's operation on the lock-free skiplist. An encountered node is a node that has been, or is in the process of being logically-deleted from the lock-free skiplist.

However, if the snip operation was successful (such that the encountered node has been snipped out of the iterated list-level), the lock-free find node process 300 continues to an 'advance' procedure 321 that advances on the iterated list-level to the next node and then to the 'while marked' procedure 311 such that the lock-free find node process 300 continues to snip encountered nodes on that list-level until an unmarked list-level reference is reached.

The 'continue advance' decision procedure 313 on reaching the bottom-list-level will eventually stop at the located node which has a comparison transition key (that is, the key of the first node with an unmarked bottom-list-level reference that is equal to or greater than the sought-after key).

The lock-free find node process 300 can be invoked by the Add programmed-method (subsequently described with respect to FIG. 5) or by the Remove programmed-method (as is subsequently described with respect to FIG. 6) to determine the node position and whether the comparison transition key equals the sought-after key (thus, whether the sought-after key is in the abstract set).

Note that the lock-free find node process 300 defines the node position by filling the preds [ ] and succs [ ] arrays with list-level references to ostensible predecessor nodes and successor nodes at each list-level to identify a node position for a node having the sought-after key (whether or not such a node actually exists). Further, note that the list-level references returned in preds [ ] is to predecessor nodes having keys strictly less than the sought-after key and that that succs [0] identifies a located node that has a comparison transition key with respect to the sought-after key. In addition, if the list-level reference in a node is marked, the lock-free find node process 300 does not examine the encountered node's key but physically deletes (snips) the encountered node from that list-level. Also note that even if the comparison transition key is not the sought-after key, the node position for the sought-after key has been determined because the preds [ ] and succs [ ] arrays for all list-levels have been determined and thus the node position specifies where, in each list-level, a node with the sought-after key would be located.

Note the order in which list-level manipulations take place in the interactions between the Find operation and the subsequently described Add and Remove operations. As will be seen, the Add operation sets a new node's higher-list-level references to its ostensible successor nodes before it links the new node into the bottom-list-level, meaning that the newly added node is ready to be removed from the lock-free skiplist the moment the new node is added to the bottom-list-level. Similarly, the Remove operation marks list-level references of the node being removed from the node's top-list-level down to its bottom-list-level. Thus, once a node is logically-deleted from the bottom-list-level (such that node's key is no longer a member of the abstract set), the key in that node will be ignored by other concurrent or subsequent Find ( ) invocations.

The pseudocode for one embodiment of the lock-free find node process 300 starts at pseudocode statement 105 (the Find programmed-method). The node definition and constructors are shown at pseudocode statements 1-34. This embodiment of the Find programmed-method starts traversing the SkipList from the TopLevel of the Head sentinel (the left-sentinel), which has the maximal allowed list-level. It then advances in each list-level across the list, filling in pred (with a list-level reference to the predecessor node) and curr (a list-level reference to the current node) until curr identifies a predecessor node that has largest key value on that list-level that is strictly less than the sought-after key (pseudocode statements 116-129). While advancing in the list-level, if Find ( ) encounters a node (an encountered node) that has a marked list-level reference, the encountered node is snipped out from that list-level (pseudocode statements 118-123). Note that the snipping out of the encountered node from the list-level is accomplished using a compare-and-set operation that validates that the Next field of the predecessor node at that list-level is unmarked and refers to the encountered node.

Once an unmarked curr list-level reference is found, it is tested to see if the key of the current node (the node referenced by curr) is less than the sought-after key (pseudocode statement 124). If so, pred is advanced to curr and curr is advanced to succ (pseudocode statement 125). Otherwise, the key of the current node is greater than or equal to the sought-after key. Thus, the current value of pred is the immediate list-level reference to the predecessor node needed for the node position at the current list-level. Thus Find ( ) breaks out of the current list-level advance loop and saves the current values of pred and curr in preds [ ] and succs [ ] at that list-level (pseudocode statement 130). The programmed-method descends to each next lower-list-level without ever advancing past any node having a key equal to or greater than the sought-after key and while snipping nodes that have a marked list-level reference at that list-level from that list-level.

The Find programmed-method continues until it reaches the bottom-list-level of the lock-free skiplist. When the traversal stops on the bottom-list-level, the node position is fully defined as is the ostensible located node.

Note that if a sought-after key is in the abstract set, the node that includes the sought-after key will be found at the bottom-list-level even if that node has been logically-deleted from higher-list-levels. Moreover, if that node is found, it cannot have been completely logically-deleted from the lock-free skiplist because if it had been completely logically-deleted, it would have been snipped out from the bottom-list-level by pseudocode statements 118-123. Therefore, the test at pseudocode statement 133 to determine whether the sought-after key is in the abstract set need only check if the key of the located node, which is identified by curr, equals the sought-after key.

The linearization point for Find ( ) (whether the sought-after key is found or not) occurs when the curr list-level reference on the bottom-list-level is set at either pseudocode statement 115 or 121, for the last time before success or failure is determined at pseudocode statement 133.

Both the subsequently discussed Add and Remove programmed-methods invoke the lock-free find node process 300 and thus, none of the Find, Add or Remove operations has the wait-free characteristic because, if there is sufficient contention, the Find operation will restart when snipping nodes from the list-levels. Because invocations of the Contains programmed-method usually outnumber invocations of the Add and Remove programmed-methods, the Contains programmed-method is more likely to cause contention if it were to use the Find operation.

The Contains programmed-method described herein has the wait-free characteristic. Like Find ( ), Contains( ) skips over marked list-level references and does not look at the key of such a node. As is subsequently described however, Contains ( ) does not perform the physical deletion of logically-deleted nodes and thus does not restart. Thus, the lock-free skiplist Contains operation is wait-free and will operate while concurrent Find, Add and Remove operations are in progress and altering the lock-free skiplist.

Figure 4:
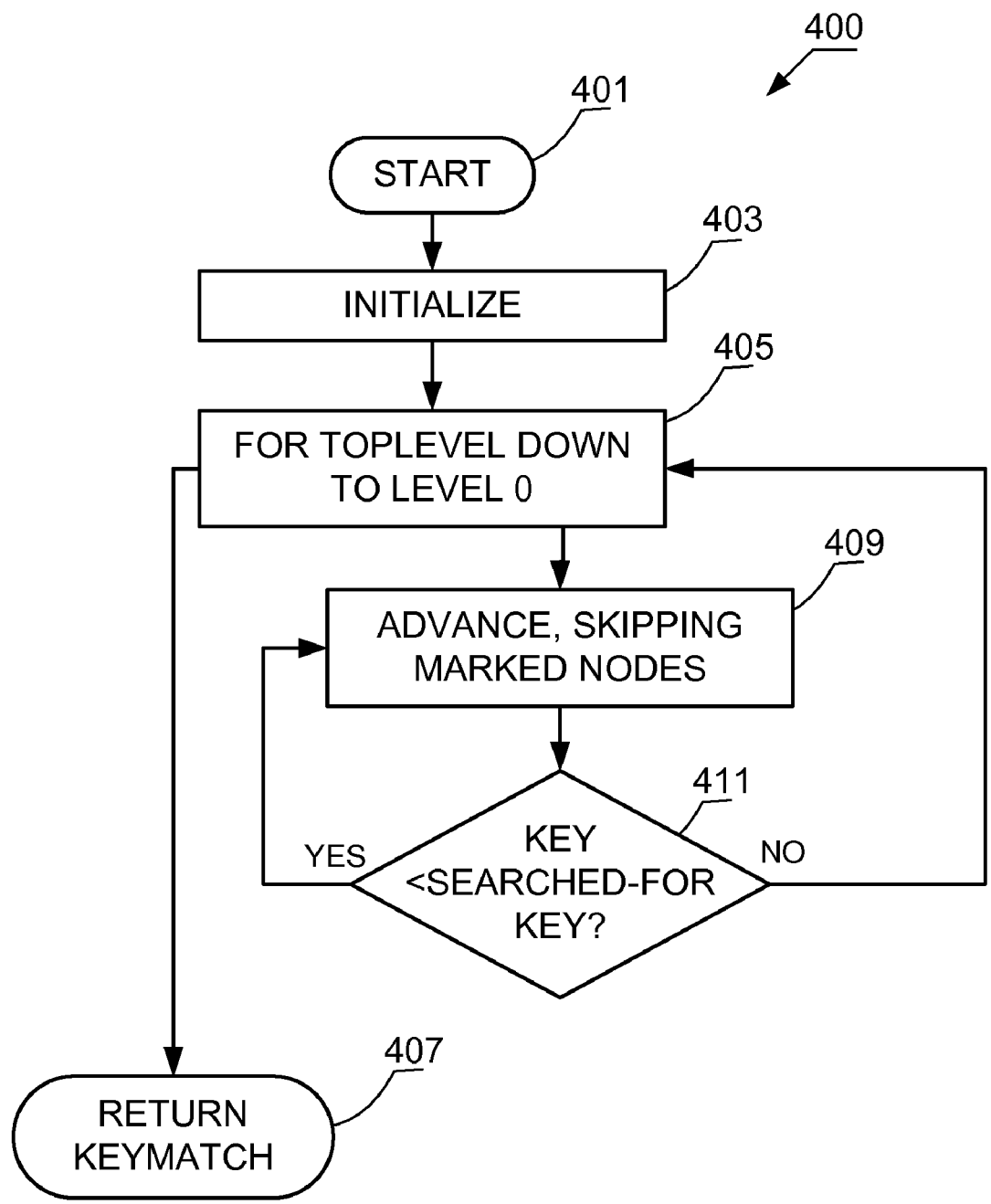
FIG. 4 illustrates a wait-free contains process.

FIG. 4 illustrates a wait-free contains process 400 that initiates at a start terminal 401, continues to an 'initialization' procedure 403 to perform any needed initialization, and then to an 'iterate top level down to level 0' procedure 405. The 'iterate top level down to level 0' procedure 405 starts the search for the sought-after key on the top-list-level of the left-sentinel node. The search on the bottom-list-level terminates at a located node. Then the wait-free contains process 400 continues to a return keymatch terminal 407 that determines whether the sought-after key is equal to the comparison transition key of the located node (thus, whether the sought-after key is a member of the abstract set) and returns a Boolean value accordingly.

On each list-level of the lock-free skiplist, an 'advance-on-level' procedure 409 atomically retrieves the list-level reference of a node, and if the list-level reference is marked will continue to advance on that list-level until a node with an unmarked list-level reference is found, thus, skipping over encountered nodes that are logically-deleted on that list-level. If an unmarked list-level reference is found by the 'advance-on-level' procedure 409, the wait-free contains process 400 continues to a 'descend list-level' decision procedure 411 that compares the key of the node containing the unmarked list-level reference to the sought-after key. If the key of the node is less than the sought-after key, the wait-free contains process 400 continues back to the 'advance-on-level' procedure 409 to continue advancing across the nodes on the list-level. However, if the 'descend list-level' decision procedure 411 determines that the key of the node is greater-than or equal to the sought-after key, the wait-free contains process 400 returns to the 'iterate top level down to level 0' procedure 405 to descend to the next lower-list-level.

The pseudocode for one embodiment of the wait-free contains process 400 starts at pseudocode statement 137. Contains ( ) traverses the SkipList in the same way as Find ( ), descending level by level from the left-sentinel node. Like Find ( ), Contains ( ) ignores the key of a node that has a marked list-level reference on the list-level being traversed. However, unlike Find ( ), Contains ( ) does not snip out a node from a list-level even if the list-level reference is marked. Instead, Contains ( ) jumps over such encountered nodes (pseudocode statements 146-149).

The wait-free contains process 400 is correct even during concurrent Find, Add or Remove operations because Contains ( ) preserves the same properties as Find ( ). For example, the list-level reference stored in preds [ ], on any level, by Find ( ) never identifies a node (that has an unmarked bottom-list-level reference) whose key is greater than or equal to the sought-after key and the pred variable of Contains ( ) arrives on the bottom-list-level at a node in front of, never behind, a node that contains the sought-after key. Thus, if a new node is added before Contains ( ) starts, then it will be found. Moreover, as will be subsequently described, Add ( ) calls Find ( ), which physically deletes marked nodes from the bottom-list-level, before inserting the new node. It follows that if Contains ( ) does not find a node with the sought-after key, or finds a node with the sought-after key at the bottom-list-level but in a node with a marked bottom-list-level reference, then any concurrently added node that was not found must have been added to the bottom-list-level after the start of the Contains ( ) call, so it is correct to return false at pseudocode statement 158 to show that the sought-after key was not in the abstract set.

Figure 5:
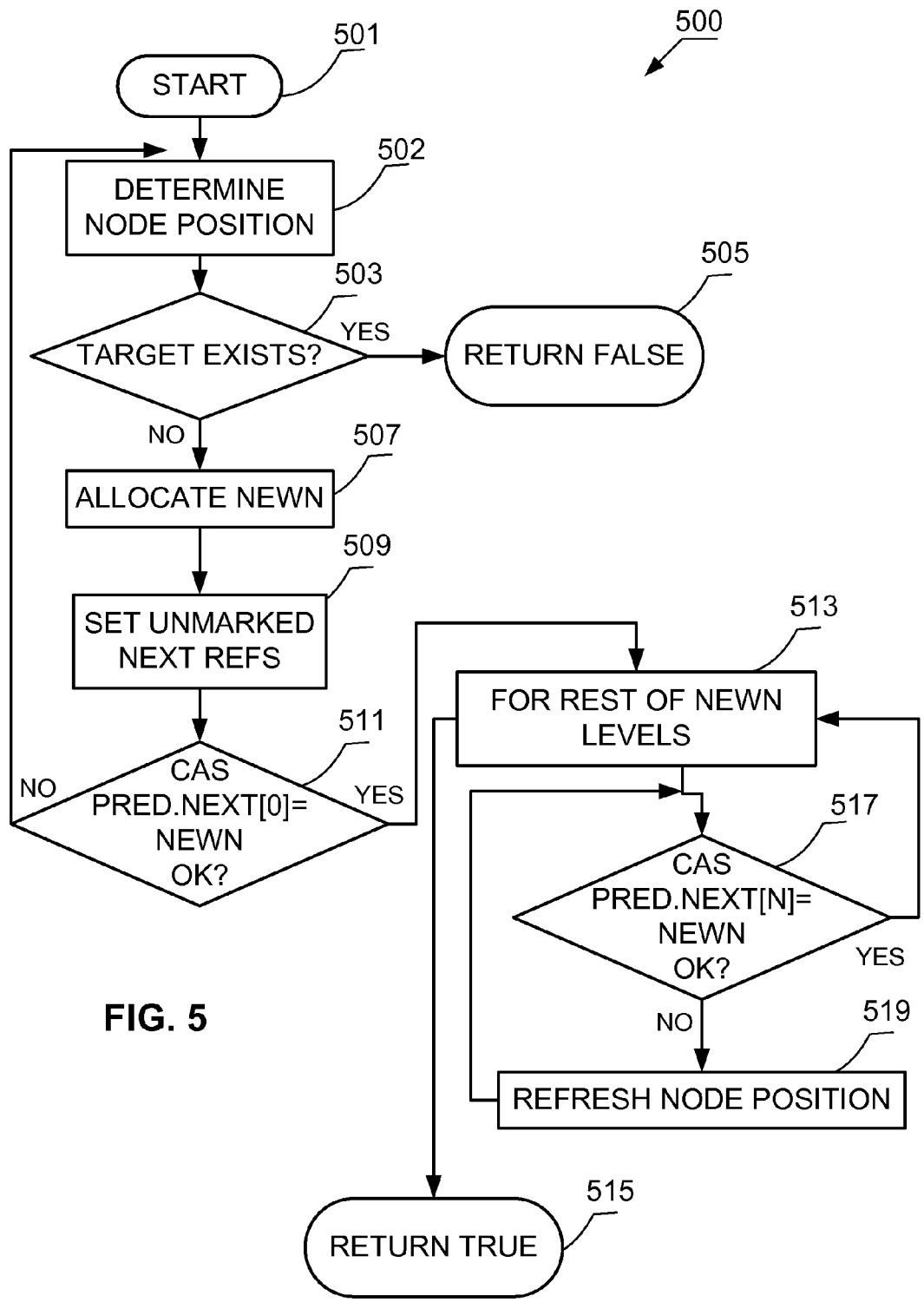
FIG. 5 illustrates a lock-free add process.

FIG. 5 illustrates a 'lock-free add' process 500 that adds a node with the to-be-added key to the lock-free skiplist. The 'lock-free add' process 500 initiates at a start terminal 501, performs any needed initialization (not shown) and continues to a 'determine node position' procedure 502 that invokes the lock-free find node process 300 to search the lock-free skiplist for the to-be-added key (the sought-after key) and to obtain the node position. Next, a 'target exists' decision procedure 503 determines whether the comparison transition key of the located node equals the sought-after key. If so, the 'lock-free add' process 500 continues to a return false terminal 505 to indicate that the addition failed as the to-be-added key is already in the abstract set.

However, if the comparison transition key did not equal the sought-after key, the 'lock-free add' process 500 continues to an 'allocate new node' procedure 507 that allocates a new node with the to-be-added key and a randomly chosen TopLevel. Once the new node is allocated, a 'set Next references in new node' procedure 509 sets the list-level references in the Next field as unmarked and to the values of the successor nodes from the node position returned from the lock-free find node process 300. Once the new node's list-level references are set, the 'lock-free add' process 500 continues to a 'link new node to bottom-list-level' CAS decision procedure 511 that performs a compare-and-set operation on the bottom-list-level reference of the predecessor node, so that the predecessor node identifies the new node as its successor node on the bottom-list-level. If the 'link new node to bottom-list-level' CAS decision procedure 511 was not successful (for example, if the predecessor node's bottom-list-level reference is marked or does not match the expected value from the node position), the 'lock-free add' process 500 continues back to the 'determine node position' procedure 502 to retry the operation with an updated node position.

However, if the 'link new node to bottom-list-level' CAS decision procedure 511 was successful, the to-be-added key is now in the abstract set (this is the linearization point for the 'lock-free add' process 500). The 'lock-free add' process 500 continues to an 'iterate rest of new node levels' procedure 513 to complete linking the new node into the lock-free skiplist. The 'iterate rest of new node levels' procedure 513 iterates from the next-to-bottom-list-level reference to the top-list-level reference of the new node. Once the new node is linked into each of its list-levels the 'lock-free add' process 500 completes through a return true terminal 515.

As each list-level reference of the predecessor node is iterated, a 'link new node to level' CAS decision procedure 517 attempts a compare-and-set operation for the ostensible predecessor node on that list-level from the corresponding list-level reference from the node position to set the list-level reference for the new node in the predecessor node's appropriate list-level. If the 'link new node to level' CAS decision procedure 517 was successful, the 'lock-free add' process 500 returns to the 'iterate rest of new node levels' procedure 513 for the next iteration. However, if the 'link new node to level' CAS decision procedure 517 was not successful, the 'lock-free add' process 500 continues to a 'refresh node position' procedure 519 that invokes the lock-free find node process 300 to update the node position (thus the predecessor node and successor node list-level references). Note that the predecessor node bottom-list-level is not changed. After the node position is updated, the 'lock-free add' process 500 continues back to the 'link new node to level' CAS decision procedure 517 to again attempt to link the new node into the list-level.

The pseudocode for one embodiment of the 'lock-free add' process 500 starts at pseudocode statement 36, and uses Find ( ) (invocation at pseudocode statement 42) to determine whether a node with the to-be-added key (the sought-after key) is already in the abstract set and to obtain the node position (the predecessor node and successor node list-level reference arrays for the new node's ostensible predecessor nodes and successor nodes).

If a node with the sought-after key having an unmarked bottom-list-level reference is found, Find ( ) returns true and Add ( ) returns false, indicating that the specified key is already in the abstract set. The unsuccessful Add ( ) linearization point is the same as the successful Find( ) linearization point from the Find( ) invocation at pseudocode statement 42.

However, if no node with the sought-after key having an unmarked bottom-list-level reference is found, then Add ( ) attempts to insert a new node with the sought-after key to the lock-free skiplist at the node position.

A new node is created with the sought-after key and a randomly chosen TopLevel. The node's Next list-level references are unmarked and set to the ostensible successor nodes provided by the node position (pseudocode statements 46-49). Next, Add( ) attempts to insert the new node by linking it into the bottom-list-level of the lock-free skiplist between the nodes referenced by preds [0] and succs [0] from the node position. The insertion uses a compare-and-set operation to set the bottom-list-level reference while validating that the nodes referenced by preds [0] and succs [0] still refer one to the other and that preds [0] has not been removed from the bottom-list-level (pseudocode statement 53). If the compare-and-set operation fails, the node position is now invalid and the call restarts. If the compare-and-set operation succeeds, the new node has been added to the bottom-list-level and the sought-after key is now part of the abstract set. Pseudocode statement 53 is the linearization point for Add ( ).

Then Add ( ) links the new node into the higher-list-levels (pseudocode statements 56-64). For each list-level, it attempts to splice the new node into the lock-free skiplist by setting the predecessor node's list-level reference (if it currently references the same successor node as the ostensible list-level reference in the new node, which was previously set from the node position) to the new node (pseudocode statement 60). If the compare-and-set operation was successful, Add ( ) breaks the retry loop and moves up to the next list-level. If unsuccessful, then the node referenced by the predecessor node must have changed or pred must have been marked (which means that the predecessor was logically deleted from that list level) subsequent to the Find ( ) invocation of pseudocode statement 42, and Find ( ) is again called to update the node position (pseudocode statement 62). The Boolean result returned by Find ( ) at pseudocode statement 62 is ignored because Add ( ) only needs to update the node position (to obtain new ostensible predecessor nodes and successor nodes) for the remaining unlinked list-levels. Once the new node is linked into all of its list-levels, the programmed-method returns true (pseudocode statement 65).

Figure 6:
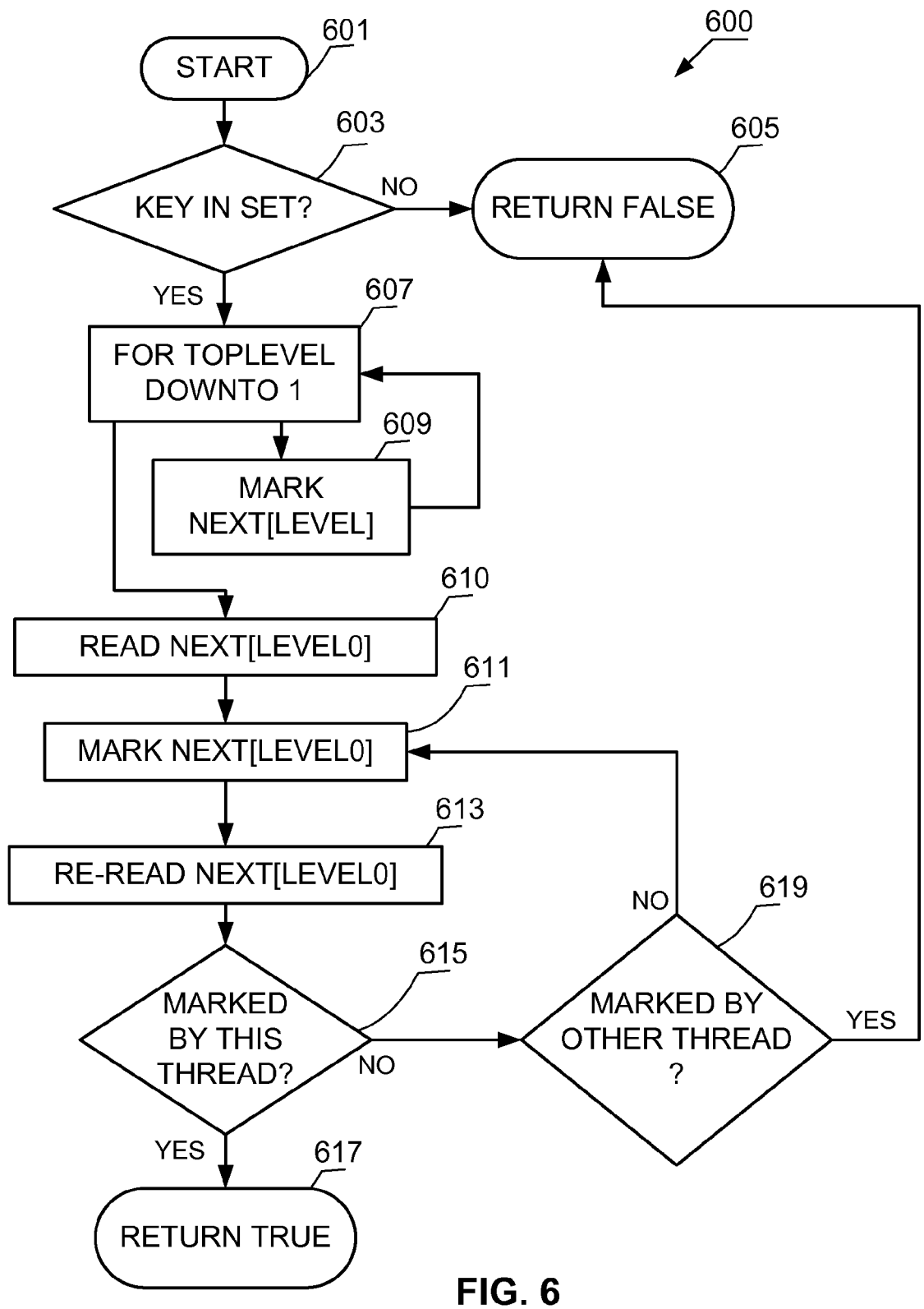
FIG. 6 illustrates a lock-free remove process.

FIG. 6 illustrates a lock-free remove process 600 that removes a node having a sought-after key from the lock-free skiplist. The lock-free remove process 600 initiates at a start terminal 601, performs any needed initialization (not shown), and continues to a 'key in set' decision procedure 603. The 'key in set' decision procedure 603 invokes the lock-free find node process 300 to determine if a node with the sought-after key is linked into the bottom-list-level and has an unmarked bottom-list-level reference. If no such node exists, the lock-free remove process 600 continues to a return false terminal 605 to indicate that the sought-after key was not in the abstract set.

However, if the 'key in set' decision procedure 603 finds a located node that has a comparison transition key which is equal to the sought-after key, the lock-free remove process 600 continues to an 'iterate levels down to 1' procedure 607 that iterates each of the list-level references in the Next field starting at the located node's topLevel down to its next-to-bottom-list-level. As each list-level is iterated, the corresponding list-level reference is atomically marked by a 'mark list-level reference' procedure 609 (that will retry the marking, if needed, until the list-level reference is marked). One skilled in the art will understand that the node is logically-deleted from each list-level once that list-level's list-level reference is marked.

At the completion of the 'iterate levels down to 1' procedure 607, the node still remains in the lock-free skiplist and the sought-after key remains in the abstract set because the bottom-list-level reference of the node containing the sought-after key has not yet been marked.

Next a 'read bottom-list-level reference' procedure 610 obtains the current value of the bottom-list-level reference in preparation for attempting to mark the bottom-list-level reference. Then a 'mark bottom-list-level reference' procedure 611 attempts to mark the bottom-list-level reference and a 're-read bottom-list-level reference' procedure 613 again atomically obtains the now-current value of the bottom-list-level reference and its mark status.

Next, a 'marked by this thread' decision procedure 615 determines whether the 'mark bottom-list-level reference' procedure 611 was successful (that is, whether the bottom-list-level reference had not changed from the expected value and that the mark was not set prior to the 'mark bottom-list-level reference' procedure 611). If this determination is successful, the lock-free remove process 600 continues to a return true terminal 617 to return true (which means that the sought-after key was in the abstract set when Remove( ) was invoked and that the sought-after key is no longer in the abstract set).

However, if the 'marked by this thread' decision procedure 615 determines that the bottom-list-level reference changed from the expected results (such as can result from a race) the lock-free remove process 600 advances to a 'marked by other thread' decision procedure 619 that determines whether the bottom-list-level reference was marked by some other thread. If so, the lock-free remove process 600 exits through the return false terminal 605 to show that the sought-after key was not in the abstract set when Remove ( ) was invoked. However, if the bottom-list-level reference was not as expected, but the bottom-list-level reference was not marked, the lock-free remove process 600 continues back to the 'mark bottom-list-level reference' procedure 611 to retry the marking using the list-level references from the 're-read bottom-list-level reference' procedure 613.

In some embodiments the return true terminal 617 can also invoke the lock-free find node process 300 again to physically delete nodes from the lock-free skiplist that were logically-deleted.

The pseudocode for one embodiment of the lock-free remove process 600 starts at pseudocode statement 70, uses Find ( ) (invocation at pseudocode statement 76) to determine whether an unmarked node with the sought-after key is on the bottom-list-level (thus again determining the node position, the located node and the comparison transition key). If no such node is found in the bottom-list-level, or the node with a matching key has a marked bottom-list-level reference, Find ( ) returns false. The linearization point of the unsuccessful Remove ( ) is that of the Find programmed-method called at pseudocode statement 76. Note that as Find ( ) encounters marked list-level references, it will have physically deleted the corresponding node from that list-level.

If the located node has a comparison transition key equal to the sought-after key, Find( ), starting from the located node's TopLevel, marks all list-level references down to, but not including, the bottom-list-level reference (pseudocode statements 81-88) by repeatedly reading the list-level reference and its mark stored in Next and applying AttemptMark (pseudocode statement 85). If the list-level reference is found to be marked (either because it was already marked or because the attempt succeeded), the programmed-method descends to the next list-level. Otherwise, the current list-level reference is reread since it must have been changed by another concurrent thread and the marking attempt is repeated.

Once all but the bottom-list-level references have been marked, Remove( ) marks the bottom-list-level reference. This marking (pseudocode statement 93), if successful, is the linearization point of a successful Remove ( ). Remove ( ) tries to mark the bottom-list-level reference using a compare-and-set operation. If successful, Remove ( ) can determine whether the thread within which Remove ( ) was executing was the thread that changed the mark from false to true in which case the Remove operation is successful, and it returns true (pseudocode statements 95-98). Before returning true, Find ( ) can be called again. This call is an optimization: as a side effect Find ( ) physically deletes all logically-deleted links found in the traversal of the lock-free skiplist data structure up to the node position of the sought-after key. Thus, if Remove ( ) has this optimization, the lock-free skiplist will be cleaned of all logically-deleted nodes to the point where the now-removed sought-after key would be positioned.

However, if the compare-and-set operation call failed, but the bottom-list-level reference is marked (pseudocode statements 94 and 99), then another thread must have concurrently removed the node containing the sought-after key prior to this thread's attempt to do so. Thus, Remove ( ) returns false because the sought-after key was not in the abstract set. The linearization point of this unsuccessful Remove ( ) is the linearization point of the Remove ( ) by the thread that successfully marked the bottom-list-level reference of the node containing the sought-after key. Notice that this linearization point must occur during the execution of this Remove ( ) invocation because the Find( ) at (pseudocode statement 76) previously found the node to be unmarked.

Finally, if the compare-and-set operation fails and the bottom-list-level reference of the node is unmarked, then the list-level reference in Next must have changed concurrently. Since the node is known, there is no need to call Find ( ) again, and Remove ( ) simply uses the new value read from Next by pseudocode statement 94 to retry the marking. The pseudocode follows:

```
 1  public final class LockFreeSkipList<T> {
 2     static final int MAX_LEVEL = ...;
 3     final Node<T> head = new Node<T>(Integer.MIN_VALUE);
 4     final Node<T> tail = new Node<T>(Integer.MAX_VALUE);
 5     public LockFreeSkipList( ) {
 6        for (int i = 0; i < head.next.length; i++) {
 7           head.next[i] = new
                 AtomicMarkableReference<LockFreeSkipList.Node<T>>
                 (tail, false);
 8        }
 9     }
10     public static final class Node<T> {
11        final T value; final int key;
12        final AtomicMarkableReference<Node<T>>[ ] next;
13        private int topLevel;
14        // constructor for sentinel nodes
15        public Node(int key) {
16           this.value = null;
17           this.key = key;
18           next = (AtomicMarkableReference<Node<T>>[ ]) new
                    AtomicMarkableReference[MAX_LEVEL + 1];
19           for (int i = 0; i < next.length; i++) {
20              next [i] = new AtomicMarkableReference<Node<T>>
                    (null,false);
21           }
22           topLevel = MAX_LEVEL;
23        }
24        // constructor for ordinary nodes
25        public Node(T x, int height) {
```

```
26        value = x;
27        key = x.hashCode( );
28        next =(AtomicMarkableReference<Node<T>>[ ]) new
              AtomicMarkableReference[height+1];
29        for (int i = 0; i < next.length; i++) {
30          next [i] = new AtomicMarkableReference<Node<T>>
              (null,false);
31        }
32        topLevel = height;
33      }
34    }
35
36    boolean add(T x) {
37      int topLevel = randomLevel( );
38      int bottomLevel = 0;
39      Node<T>[ ] preds = (Node<T>[ ]) new
              Node[MAX_LEVEL + 1];
40      Node<T>[ ] succs = (Node<T>[ ]) new
              Node[MAX_LEVEL + 1];
41      while (true) {
42        boolean found = find(x, preds, succs);
43        if (found) {
44          return false;
45        } else {
46          Node<T> newNode = new Node(x, topLevel);
47          for (int level = bottomLevel; level <= topLevel;
              level++) {
48            Node<T> succ = succs[level];
49            newNode.next[level].set(succ, false);
50          }
51          Node<T> pred = preds[bottomLevel];
52          Node<T> succ = succs[bottomLevel];
53          if (!pred.next[bottomLevel].
                  compareAndSet(succ, newNode, false, false)) {
54            continue;
55          }
56          for (int level = bottomLevel+1; level <= topLevel;
              level++) {
57            while (true) {
58              pred = preds[level];
59              succ = succs[level];
60              if (pred.next[level].
                    compareAndSet(succ, newNode, false, false))
61                break;
62              find(x, preds, succs);
63            }
64          }
65          return true;
66        }
67      }
68    }
69
70    boolean remove(T x) {
71      int bottomLevel = 0;
72      Node<T>[ ] preds = (Node<T>[ ]) new
              Node[MAX_LEVEL + 1];
73      Node<T>[ ] succs = (Node<T>[ ]) new
              Node[MAX_LEVEL + 1];
74      Node<T> succ;
75      while (true) {
76        boolean found = find(x, preds, succs);
77        if (!found) {
78          return false;
79        } else {
80          Node<T> nodeToRemove = succs[bottomLevel];
81          for (int level=nodeToRemove.topLevel;
                  level>=bottomLevel+1;level--) {
82            boolean[ ] marked = {false};
83            succ = nodeToRemove.next[level].get(marked);
84            while (!marked[0]) {
85              nodeToRemove.next[level].attemptMark(succ, true);
86              succ = nodeToRemove.next[level].get(marked);
87            }
88          }
89          boolean[ ] marked = {false};
90          succ = nodeToRemove.next[bottomLevel].get(marked);
91          while (true) {
92            boolean iMarkedIt =
93              nodeToRemove.next[bottomLevel].
                    compareAndSet(succ,succ, false, true);
94            succ = succs[bottomLevel].next[bottomLevel].-
                    get(marked);
95            if (iMarkedIt) {
96              find(x, preds, succs);
97              return true;
98            }
99            else if (marked[0]) return false;
100         }
101       }
102     }
103   }
104
105   boolean find(T x, Node<T>[ ] preds, Node<T>[ ] succs) {
106     int bottomLevel = 0;
107     int key = x.hashCode( );
108     boolean[ ] marked = {false};
109     boolean snip;
110     Node<T> pred = null, curr = null, succ = null;
111     retry:
112       while (true) {
113         pred = head;
114         for (int level = MAX_LEVEL; level >= bottomLevel;
                level--) {
115           curr = pred.next[level].getReference( );
116           while (true) {
117             succ = curr.next[level].get(marked);
118             while (marked[0])
119               snip = pred.next[level].
                        compareAndSet(curr, succ, false, false);
120             if (!snip) continue retry;
121             curr = pred.next[level].getReference( );
122             succ = curr.next[level].get(marked);
123           }
124           if (curr.key < key){
125             pred = curr; curr = succ;
126           } else {
127             break;
128           }
129         }
130         preds[level] = pred; succs[level] = curr;
131       }
132       return (curr.key == key);
133     }
134   }
135 }
136
137 boolean contains(T x) {
138   int bottomLevel = 0;
139   int v = x.hashCode( );
140   boolean[ ] marked = {false};
141   Node<T> pred = head, curr = null, succ = null;
142   for (int level = MAX_LEVEL; level >= bottomLevel;
          level--) {
143     curr = pred.next[level].getReference( );
144     while (true) {
145       succ = curr.next[level].get(marked);
146       while (marked[0]) {
147         curr = curr.next[level].getReference( );
148         succ = curr.next[level].get(marked);
149       }
150       if (curr.key < v){
151         pred = curr;
152         curr = succ;
153       } else {
154         break;
155       }
156     }
157   }
158   return (curr.key == v);
159 }
```

One skilled in the art will understand that the network carries information (such as informational data as well as data that defines a computer program). The information can also be propagated using a carrier-wave. Signals capable of propagating the information include electromagnetic signals, visible or invisible light pulses, signals on a data bus, or signals propagated over any wire, wireless, or optical fiber technology that allows information to be transmitted over a network.

Programs and data are commonly read from both tangible physical media (such as a compact, floppy, or magnetic disk) and from a network. Thus, the network, like a tangible physical media, is a computer-usable data carrier.

One skilled in the art will understand that the technology described herein provides a wait-free Contains operation for a concurrent, lock-free skiplist.

From the foregoing, it will be appreciated that the technology has (without limitation) the following advantages:

1) The disclosed concurrent lock-free skiplist is significantly simpler than other concurrent lock-free skiplist implementations.

2) The disclosed concurrent lock-free skiplist provides a wait-free Contains operation for testing whether a key is a member of the abstract set represented by the lock-free skiplist.

3) The disclosed concurrent lock-free skiplist can be used in real-time applications or applications in which programmers need to understand or modify the lock-free skiplist structure.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer-controlled method for concurrently searching a memory containing a lock-free skiplist data structure to determine whether a sought-after key exists in said lock-free skiplist data structure, said method comprising:

locating said lock-free skiplist data structure in said memory, said lock-free skiplist data structure comprising a plurality of linked lists that comprises a bottom-level linked list and one or more higher-level linked lists, said lock-free skiplist data structure further comprising a plurality of nodes each of which comprises a key field and one or more list-level reference fields, each of said plurality of nodes linked to said bottom-level linked list through said one or more list-level reference fields and ordered responsive to the value of said key field;

performing a wait-free search traversal by a first execution thread for said sought-after key on said lock-free skiplist data structure while said lock-free skiplist data structure is subject to concurrent alteration of said plurality of nodes by a second execution thread, said wait-free search traversal terminating on said bottom-level linked list at a located node of said plurality of nodes, said key field of said located node containing a comparison transition key;

determining whether said sought-after key equals said comparison transition key;

returning a result responsive to said determining;

performing a lock-free traversal of said lock-free skiplist data structure for said sought-after key by said second execution thread; and determining a node position of said located node;

wherein said comparison transition key is not equal to said sought-after key, said node position including a first plurality of list-level references to one or more predecessor nodes and a second plurality of list-level references to one or more successor nodes, said first plurality of list-level references including a bottom-list-level predecessor reference to a predecessor node, said second plurality of list-level references including a bottom-list-level successor reference to a successor node, said predecessor node including a bottom-list-level reference field in said one or more list-level reference fields containing a bottom-level next reference; the method further comprising:

allocating a new node, said new node including said key field, said new node identified by a new node reference;

setting said key field to said sought-after key;

setting each of said one or more list-level reference fields in said new node to a corresponding one of said second plurality of list-level references; and linking said new node into said bottom-level linked list by atomically:

verifying that said bottom-level next reference is not marked;

verifying said bottom-level next reference identifies said successor node; and setting said bottom-list-level reference field to said new node reference.

2. The computer-controlled method of claim 1, wherein said plurality of nodes further comprises an encountered node, said wait-free search traversal further comprising:

advancing on one of said plurality of linked lists to said encountered node;

detecting a marked list-level reference in one of said one or more list-level reference fields of said encountered node, said one of said one or more list-level reference fields corresponding to said one of said plurality of linked lists; and advancing on said one of said plurality of linked lists past said encountered node irrespective of a value in said key field of said encountered node responsive to detecting.

3. The computer-controlled method of claim 1, wherein said one or more list-level reference fields comprises both a bottom-list-level reference field and a top-list-level reference field, and said plurality of nodes comprises an encountered node wherein said top-list-level reference field is linked into said one of said one or more higher-level linked lists and said bottom-list-level reference field is linked into said bottom-level linked list, the method further comprising:

advancing on one of said one or more higher-level linked lists to said encountered node by said second execution thread;

detecting a first marked list-level reference in said top-list-level reference field;

snipping, responsive to detecting said first marked list-level reference, said encountered node from said one of said one or more higher-level linked lists;

detecting a second marked list-level reference in said bottom-list-level reference field subsequent to snipping said encountered node from said one of said one or more higher-level linked lists; and snipping, responsive to detecting said second marked list-level reference, said encountered node from said bottom-level linked list whereby said encountered node is physically deleted from said lock-free skiplist data structure.

4. The computer-controlled method of claim 1, wherein said comparison transition key is equal to said sought-after key, and said one or more list-level reference fields of said located node comprises a bottom-list-level reference field containing a bottom-list-level reference and a top-list-level reference field containing a top-list-level reference, the method further comprising:

marking said top-list-level reference; attempting to mark said bottom-list-level reference by said second execution thread; determining whether said bottom-list-level reference was marked by said second execution thread responsive to attempting; and returning, by said second execution thread, a result responsive to said determining whether said bottom-list-level reference was marked by said second execution thread.

5. The computer-controlled method of claim 4, wherein said located node is a logically-deleted node and the method further comprises refreshing said node position whereby said logically-deleted node is physically deleted from said lock-free skiplist data structure.

6. The computer-controlled method of claim 1, further comprising refreshing said node position responsive to unsuccessful linking.

7. The computer-controlled method of claim 1, wherein said predecessor node comprises an upper-list-level reference field in said one or more list-level reference fields, said method further comprising setting said upper-list-level reference field to said new node reference.

8. An apparatus having a central processing unit (CPU) and a memory coupled to said CPU, said memory containing a lock-free skiplist data structure, said apparatus comprising:

a locator logic configured to locate said lock-free skiplist data structure in said memory, said lock-free skiplist data structure comprising a plurality of linked lists that comprises a bottom-level linked list and one or more higher-level linked lists, said lock-free skiplist data structure further comprising a plurality of nodes each of which comprises a key field and one or more list-level reference fields, each of said plurality of nodes linked to said bottom-level linked list through said one or more list-level reference fields and ordered responsive to the value of said key field;

a wait-free search logic configured to perform a wait-free search traversal by a first execution thread for a sought-after key on said lock-free skiplist data structure while said lock-free skiplist data structure is subject to concurrent alteration of said plurality of nodes by a second execution thread, said wait-free search traversal terminating on said bottom-level linked list at a located node of said plurality of nodes, said key field of said located node containing a comparison transition key;

a key comparison logic configured to determine whether said sought-after key equals said comparison transition key of said located node found by the wait-free search logic; a result logic configured to return a result responsive to the key comparison logic; a lock-free traversal logic configured to traverse said lock-free skiplist data structure for said sought-after key by said second execution thread; and a node locator logic configured to determine a node position of said located node responsive to the lock-free traversal logic;

wherein said comparison transition key is not equal to said sought-after key, said node position including a first plurality of list-level references to one or more predecessor nodes and a second plurality of list-level references to one or more successor nodes, said first plurality of list-level references including a bottom-list-level predecessor reference to a predecessor node, said second plurality of list-level references including a bottom-list-level successor reference to a successor node, said predecessor node including a bottom-list-level reference field in said one or more list-level reference fields containing a bottom-level next reference;

the apparatus further comprising: a node allocation logic configured to allocate a new node, to set said key field to said sought-after key and to set each of said one or more list-level reference fields in said new node to a corresponding one of said second plurality of list-level references, said new node identified by a new node reference; and an atomic linking logic, responsive to the node allocation logic, configured to link said new node into said bottom-level linked list by atomically verifying that said bottom-level next reference is not marked, verifying said bottom-level next reference identifies said successor node, and setting said bottom-list-level reference field to said new node reference.

9. The apparatus of claim 8, wherein said plurality of nodes further comprises an encountered node, said wait-free search traversal further comprising:

a list advance logic configured to advance on one of said plurality of linked lists to said encountered node;

a mark detection logic configured to detect a marked list-level reference in one of said one or more list-level reference fields of said encountered node, said one of said one or more list-level reference fields corresponding to said one of said plurality of linked lists; and wherein the list advance logic is further configured to continue to advance on said one of said plurality of linked lists past said encountered node irrespective of a value in said key field of said encountered node responsive to the mark detection logic.

10. The apparatus of claim 8, wherein said one or more list-level reference fields comprises both a bottom-list-level reference field and a top-list-level reference field, and said plurality of nodes comprises an encountered node wherein said top-list-level reference field is linked into said one of said one or more higher-level linked lists and said bottom-list-level reference field is linked into said bottom-level linked list, the apparatus further comprising:

a mark detection logic configured to detect a first marked list-level reference in said top-list-level reference field;

a list advance logic responsive to the mark detection logic and configured to advance on one of said one or more higher-level linked lists to said encountered node by said second execution thread;

a first snip logic configured to snip said encountered node from said one of said one or more higher-level linked lists;

a bottom-list-level mark detection logic configured to detect a second marked list-level reference in said bottom-list-level reference field of said encountered node subsequent to operation of the first snip logic; and a second snip logic, responsive to a bottom-list-level mark detection logic, configured to snip said encountered node from said bottom-level linked list whereby said encountered node is physically deleted from said lock-free skiplist data structure.

11. The apparatus of claim 8, wherein said comparison transition key is equal to said sought-after key, and said one or more list-level reference fields of said located node comprises a bottom-list-level reference field containing a bottom-list-level reference and a top-list-level reference field containing a top-list-level reference, the apparatus further comprising:

a higher-list-level marking logic configured to mark said top-list-level reference; a bottom-list-level marking logic configured to mark said bottom-list-level reference responsive to said second execution thread;

a test mark logic configured to determine whether said bottom-list-level reference was marked by said bottom-list-level marking logic responsive to said second execution thread; and returning, by said second execution thread, a result responsive to the test mark logic.

12. A computer program product for concurrently searching a memory containing a lock-free skiplist data structure to determine whether a sought-after key exists in said lock-free skiplist data structure, said product comprising:

a computer readable storage medium providing instructions that, when executed by a computer, cause said computer to perform a method comprising:

locating said lock-free skiplist data structure in said memory, said lock-free skiplist data structure comprising a plurality of linked lists that comprises a bottom-level linked list and one or more higher-level linked lists, said lock-free skiplist data structure further comprising a plurality of nodes each of which comprises a key field and one or more list-level reference fields, each of said plurality of nodes linked to said bottom-level linked list through said one or more list-level reference fields and ordered responsive to the value of said key field; performing a wait-free search traversal by a first execution thread for said sought-after key on said lock-free skiplist data structure while said lock-free skiplist data structure is subject to concurrent alteration of said plurality of nodes by a second execution thread, said wait-free search traversal terminating on said bottom-level linked list at a located node of said plurality of nodes, said key field of said located node containing a comparison transition key; determining whether said sought-after key equals said comparison transition key; returning a result responsive to said determining;

performing a lock-free traversal of said lock-free skiplist data structure for said sought-after key by said second execution thread; and determining a node position of said located node; wherein said comparison transition key is not equal to said sought-after key, said node position including a first plurality of list-level references to one or more predecessor nodes and a second plurality of list-level references to one or more successor nodes, said first plurality of list-level references including a bottom-list-level predecessor reference to a predecessor node, said second plurality of list-level references including a bottom-list-level successor reference to a successor node, said predecessor node including a bottom-list-level reference field in said one or more list-level reference fields containing a bottom-level next reference; the product further comprising:

allocating a new node, said new node including said key field, said new node identified by a new node reference;

setting said key field to said sought-after key;

setting each of said one or more list-level reference fields in said new node to a corresponding one of said second plurality of list-level references; and linking said new node into said bottom-level linked list by atomically:

verifying that said bottom-level next reference is not marked;

verifying said bottom-level next reference identifies said successor node; and setting said bottom-list-level reference field to said new node reference.

13. The computer program product of claim 12, wherein said one or more list-level reference fields includes both a bottom-list-level reference field and a top-list-level reference field, and said plurality of nodes including an encountered node wherein said top-list-level reference field is linked into said one of said one or more higher-level linked lists and said bottom-list-level reference field is linked into said bottom-level linked list, the product further comprising:

advancing on one of said one or more higher-level linked lists to said encountered node by said second execution thread;

detecting a first marked list-level reference in said top-list-level reference field;

snipping, responsive to detecting said first marked list-level reference, said encountered node from said one of said one or more higher-level linked lists;

detecting a second marked list-level reference in said bottom-list-level reference field subsequent to snipping said encountered node from said one of said one or more higher-level linked lists; and snipping, responsive to detecting said second marked list-level reference, said encountered node from said bottom-level linked list whereby said encountered node is physically deleted from said lock-free skiplist data structure.

14. The computer program product of claim 12, wherein said comparison transition key is equal to said sought-after key and said one or more list-level reference fields of said located node includes a bottom-list-level reference field containing a bottom-list-level reference and a top-list-level reference field containing a top-list-level reference, the product further comprising:

marking said top-list-level reference;

attempting to mark said bottom-list-level reference by said second execution thread;

determining whether said bottom-list-level reference was marked by said second execution thread responsive to attempting; and returning, by said second execution thread, a result responsive to determining said whether said bottom-list-level reference was marked by said second execution thread.

* * * * *